(12) United States Patent
Tseng et al.

(10) Patent No.: US 11,946,529 B2
(45) Date of Patent: Apr. 2, 2024

(54) SLIDING TABLE ASSEMBLY

(71) Applicant: TOYO AUTOMATION CO., LTD., Tainan (TW)

(72) Inventors: Kun-Cheng Tseng, Tainan (TW); Ming-Chi Su, Tainan (TW); En-Tzu Hsu, Tainan (TW)

(73) Assignee: Toyo Automation Co., Ltd., Tainan (TW)

( * ) Notice: Subject to any disclaimer, the term of this patent is extended or adjusted under 35 U.S.C. 154(b) by 0 days.

(21) Appl. No.: 17/664,204

(22) Filed: May 19, 2022

(65) Prior Publication Data

US 2023/0022366 A1    Jan. 26, 2023

(30) Foreign Application Priority Data

Jul. 26, 2021    (TW) .................... 110127381

(51) Int. Cl.
- *F16H 25/22* (2006.01)
- *F16C 29/04* (2006.01)
- *F16H 57/00* (2012.01)

(52) U.S. Cl.
CPC ......... *F16H 25/2247* (2013.01); *F16C 29/04* (2013.01); *F16H 57/0006* (2013.01); *F16C 2208/10* (2013.01)

(58) Field of Classification Search
CPC .. F16H 25/2247; F16H 57/0006; F16C 29/04; F16C 2208/10
See application file for complete search history.

(56) References Cited

U.S. PATENT DOCUMENTS

2006/0260464 A1*  11/2006  Sato ..................... F15B 15/1471
                                                              92/88
2021/0355993 A1*  11/2021  Sato ..................... F16C 29/082

FOREIGN PATENT DOCUMENTS

| CN | 207740347 U | | 8/2018 |
| JP | 2014126190 A | * | 7/2014 |
| TW | 201300660 A | | 1/2013 |
| TW | M455098 U | | 6/2013 |

OTHER PUBLICATIONS

Search Report appended to an Office Action, which was issued to Taiwanese counterpart application No. 110127381 by the TIPO with an English translation thereof.

* cited by examiner

*Primary Examiner* — Zakaria Elahmadi
(74) *Attorney, Agent, or Firm* — Rosenberg, Klein & Lee

(57) ABSTRACT

A sliding table assembly includes a sliding seat unit slidably mounted to a base unit. Two auxiliary sliding seats are slidably mounted to the base unit and disposed on two sides of the sliding seat unit. A connection member is connected between the auxiliary sliding seats. Two roller sets are respectively mounted to the auxiliary sliding seats. Each roller set has rollers to roll on the base unit. A driving screw rod is coupled to the sliding seat unit and embraced by the auxiliary seats. When the sliding unit is moved by the driving screw rod, it pushes the auxiliary sliding seats to slide together therewith.

8 Claims, 11 Drawing Sheets

US 11,946,529 B2

SLIDING TABLE ASSEMBLY

CROSS-REFERENCE TO RELATED APPLICATION

This application claims priority to Taiwanese Patent Application No. 110127381, filed on Jul. 26, 2021.

FIELD

The disclosure relates to a sliding table assembly for use in processing equipment.

BACKGROUND

A sliding platform support structure, as disclosed in Taiwanese Utility Model Patent No. M346692, includes a rail, a screw rod axially disposed in the rail, a nut threadedly connected to the screw rod, a sliding seat fixed to the nut, two rod sleeves disposed on two opposite sides of the sliding seat, and two unidirectional reels mounted respectively atop the rod sleeves. Each reel has a winding rope. The winding ropes of the reels are respectively connected to two opposite ends of the sliding seat. When the sliding seat is driven by the screw rod to move along the rail, the rod sleeves are moved by the sliding seat through the winding ropes of the reels.

Because the screw rod is supported by the rod sleeves, the screw rod can be prevented from sagging so that the sliding seat can move smoothly and damage of the screw rod can be avoided. However, for smooth movement of the sliding seat along the rail, bearing rollers are required to cycle between the rail and each rod sleeve. Designing the bearing rollers is time-consuming as repeated tests have to be conducted to select suitable bearing tolerance values. In addition, installation of such a rope-pulling type support structure is inconvenient.

SUMMARY

Therefore, an object of the disclosure is to provide a sliding table assembly that can alleviate at least one of the drawbacks of the prior art.

According to the disclosure, a sliding table assembly includes a base unit, a sliding seat unit, an embracing unit, and a driving unit.

The base unit extends in a lengthwise direction.

The sliding seat unit is slidable in the lengthwise direction and mounted to the base unit.

The embracing unit includes two auxiliary sliding seats, a connection member, and two roller sets. The two auxiliary sliding seats are slidable in the lengthwise direction (X) and mounted to the base unit.

The auxiliary sliding seats are respectively disposed on two sides of the sliding seat unit that are opposite in the lengthwise direction. The connection member is connected between the auxiliary sliding seats. The two roller sets are respectively mounted to the auxiliary sliding seats. Each of the roller sets has a plurality of rollers to roll on the base unit.

The driving unit includes a power driver and a driving screw rod. The power driver is mounted to the base unit. The driving screw rod is connected to the power driver and threadedly coupled to the sliding seat unit.

When the power driver drives the driving screw rod to rotate with respect to the base, the siding unit is driven by the driving screw rod to slide in the lengthwise direction and pushes the auxiliary sliding seats to slide together therewith.

BRIEF DESCRIPTION OF THE DRAWINGS

Other features and advantages of the disclosure will become apparent in the following detailed description of the embodiment with reference to the accompanying drawings, of which.

DETAILED DESCRIPTION

Figure 1:
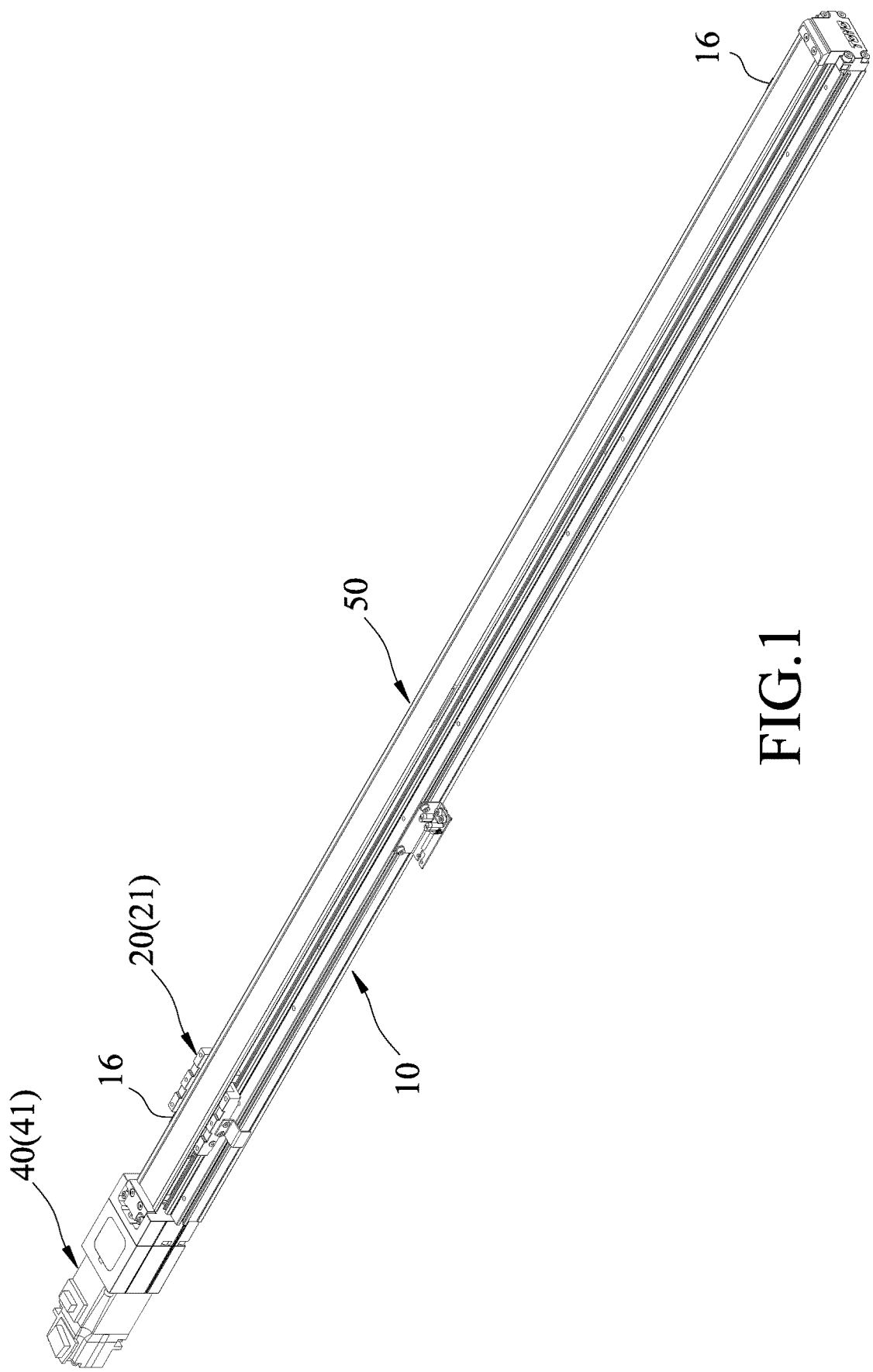
FIG. 1 is a perspective view illustrating a sliding table assembly according to an embodiment of the disclosure.
Figure 2:
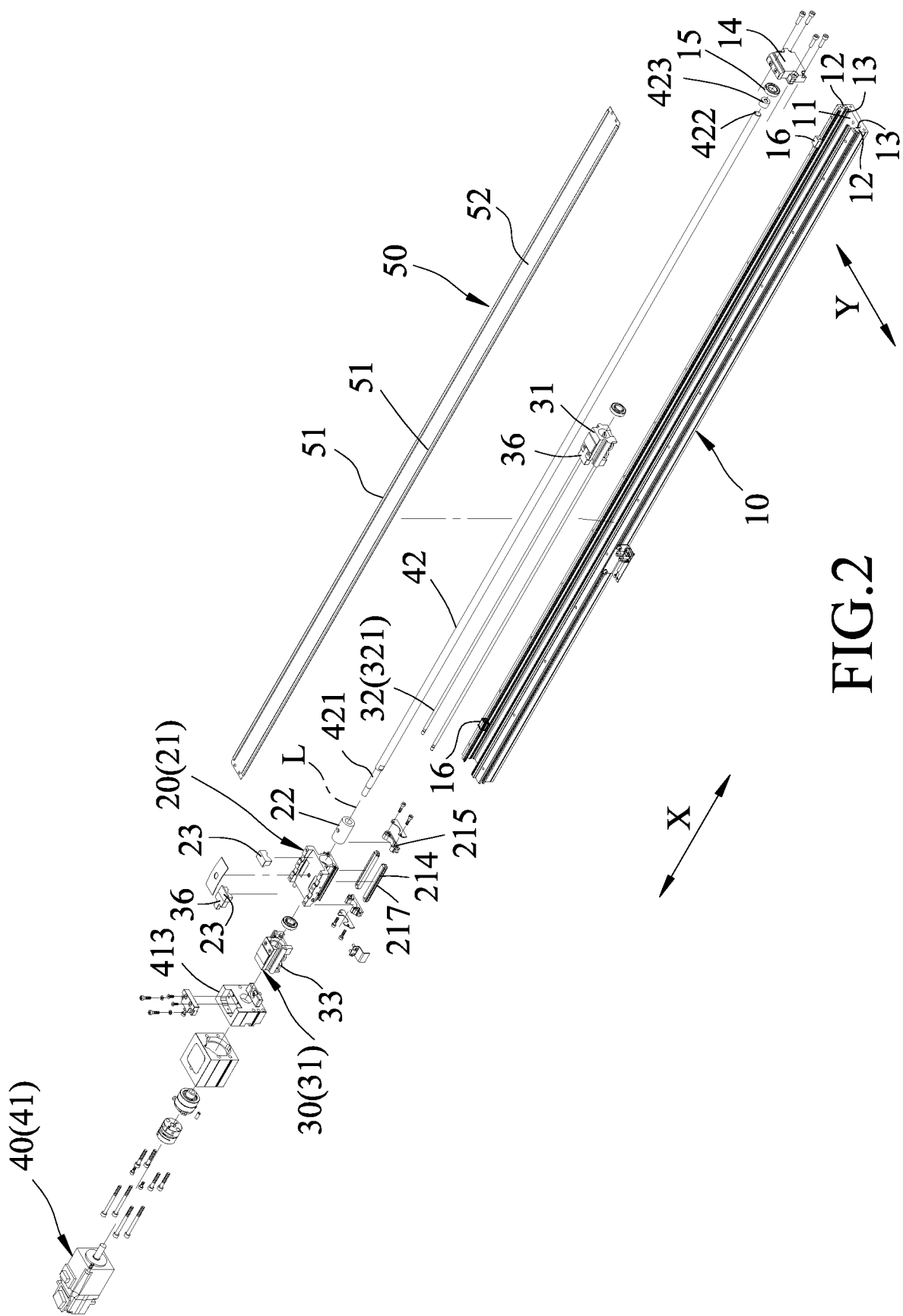
FIG. 2 is an exploded perspective view of the embodiment.
Figure 3:
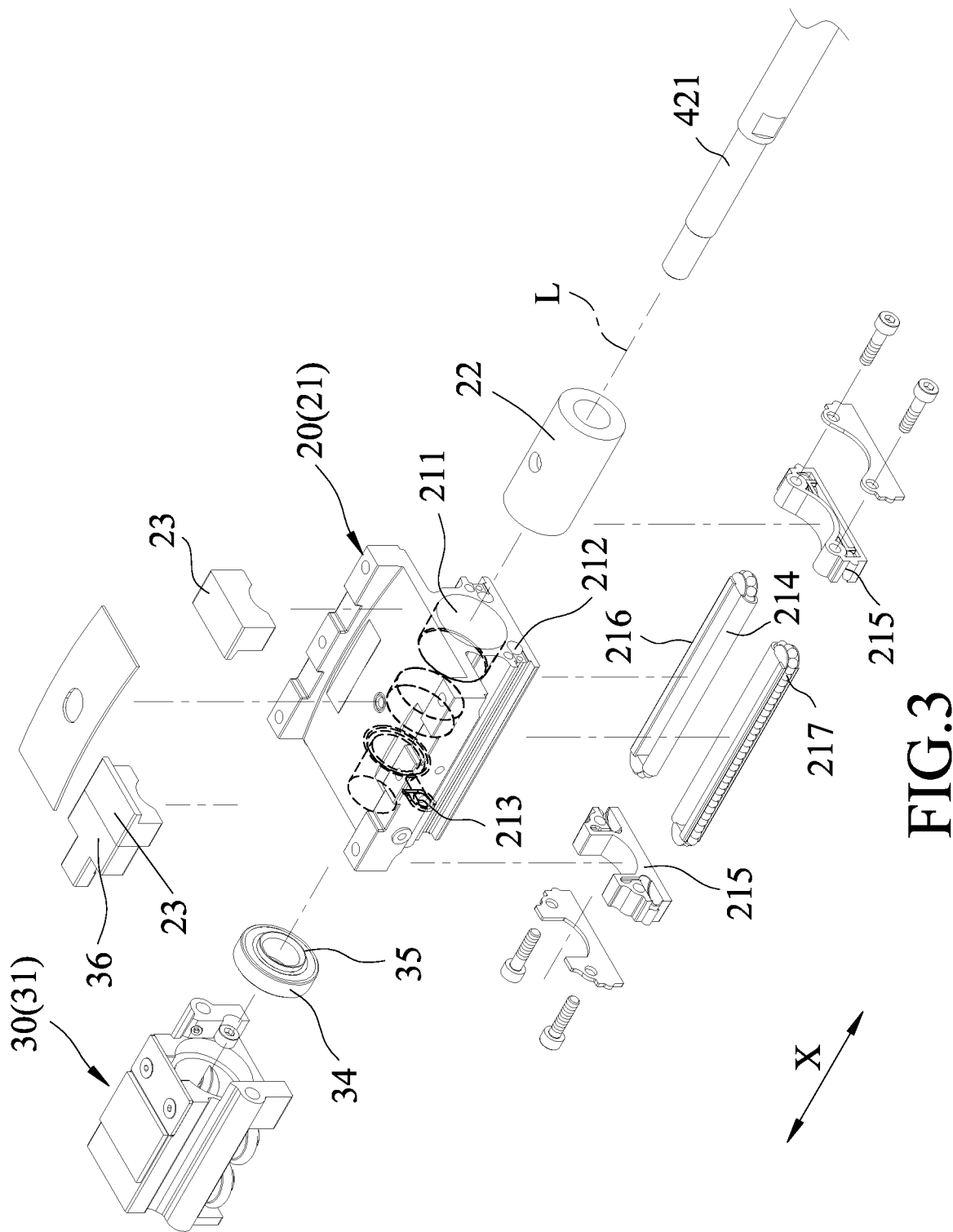
FIG. 3 is a partly enlarged exploded perspective view from FIG. 2.
Figure 4:
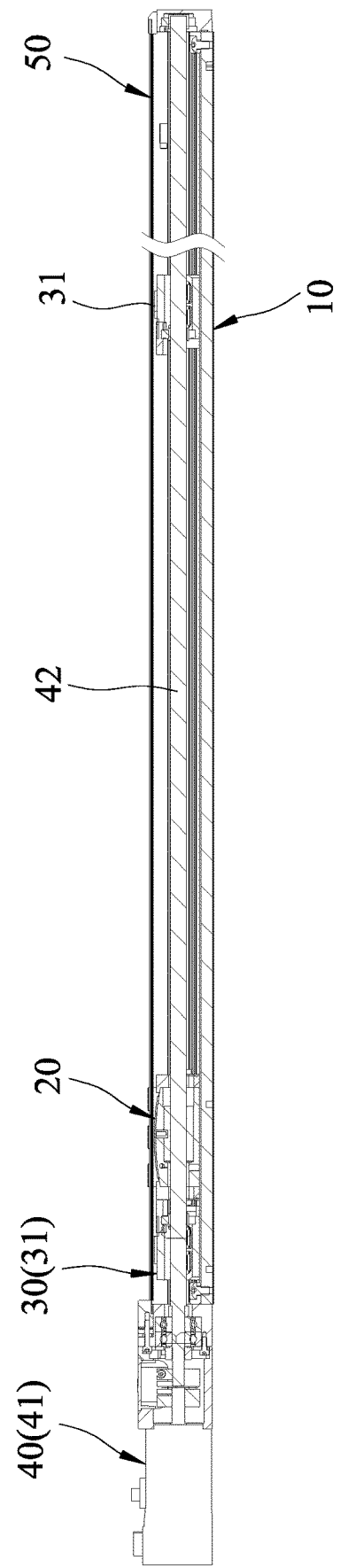
FIG. 4 is a sectional view of the embodiment.

FIGS. 1 to 4 illustrate a sliding table assembly according to an embodiment of the disclosure. The sliding table assembly includes a base unit 10, a sliding seat unit 20, an embracing unit 30, a driving unit 40, and a protective cover unit 50.

The base unit 10 extends in a lengthwise direction (X) and includes a base wall 11, two side walls 12, two first hardened rails 13, an end seat 14, an end bearing 15, and two limiting bumper blocks 16. The two side walls 12 extend from the base wall 11 and are spaced apart from each other in a transverse direction (Y) transverse to the lengthwise direction (X). The two first hardened rails 13 are respectively mounted to the side walls 12. The end seat 14 is fixed to the base and side walls 11, 12. The end bearing 15 is disposed in the end seat 14. The two limiting bumper blocks 16 are mounted to one of the side walls 12 and respectively proximate to two ends of the base unit 10 that are opposite in the lengthwise direction (X). In this embodiment, the end seat 14 has an end bumper block 141 disposed on the base wall 11 (see FIG. 7).

The sliding seat unit 20 is slidable in the lengthwise direction (X), mounted to the base unit 10, and supported by the side walls 12. The sliding seat unit 20 includes a main body 21, a nut 22, and two first bumper blocks 23. The nut 22 is fixed in the main body 21. The two first bumper blocks 23 are respectively disposed on two sides of the main body 21 that are opposite in the lengthwise direction (X). The main body 21 has an axial hole 211 extending in an axial line (L) parallel with the lengthwise direction (X), two spaced apart through holes 212 extending in the lengthwise direction (X), offset from the axial hole 211 and spaced apart from each other in the transverse direction (Y), and two another though holes 213 respectively disposed on two sides of the axial hole 211 that are opposite to each other in the transverse direction (Y). The sliding seat unit 20 further includes two inner tubes 214, two side seats 215, two second hardened rails 216, and two roller modules 217. The two inner tubes 214 are respectively extend through the through holes 212. The two side seats 215 are respectively mounted to the two opposite sides of the main body 21. The two second hardened rails 216 are fixed to the main body 21 and respectively face the first hardened rails 13. One of the inner tubes 214, the side seats 215, one of the second hardened rails 216, and one of the first hardened rails 13, cooperatively define a cyclic passage for one of the roller modules 217 to move cyclically.

Figure 5:
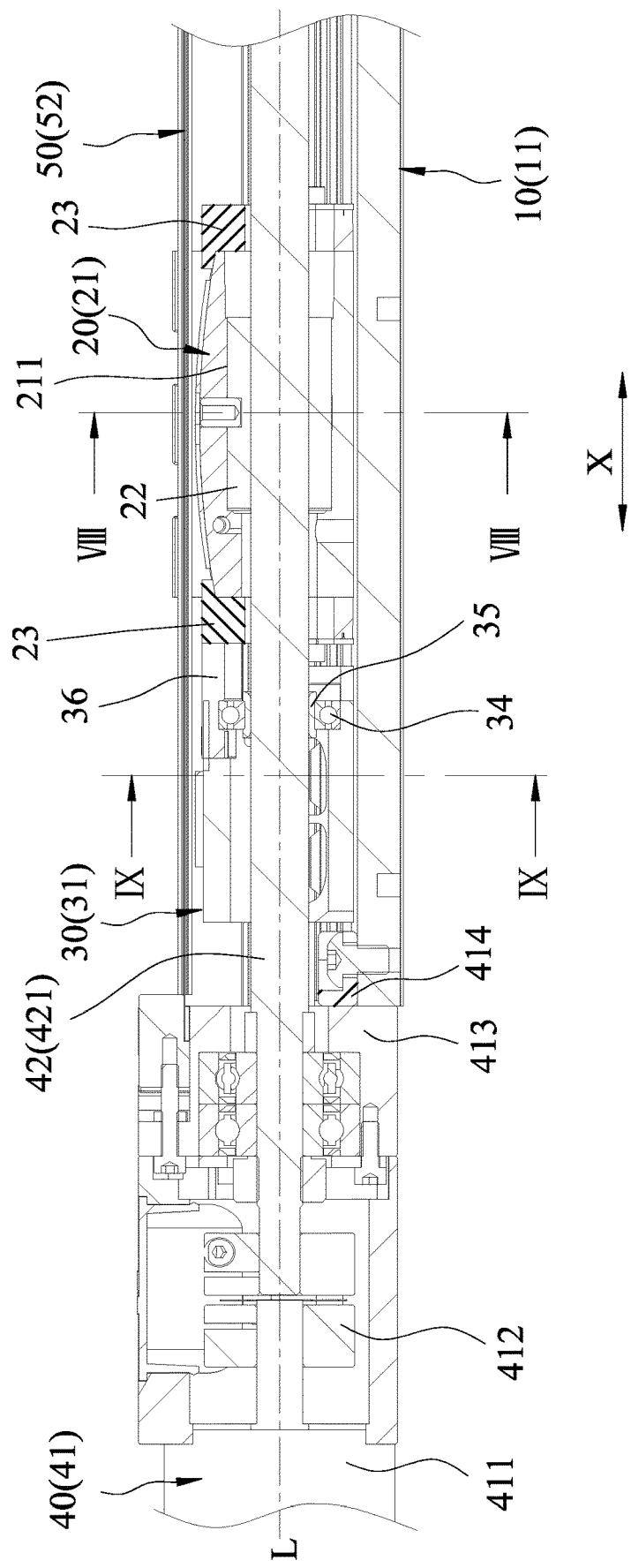
FIG. 5 is an enlarged view from FIG. 4.
Figure 6:
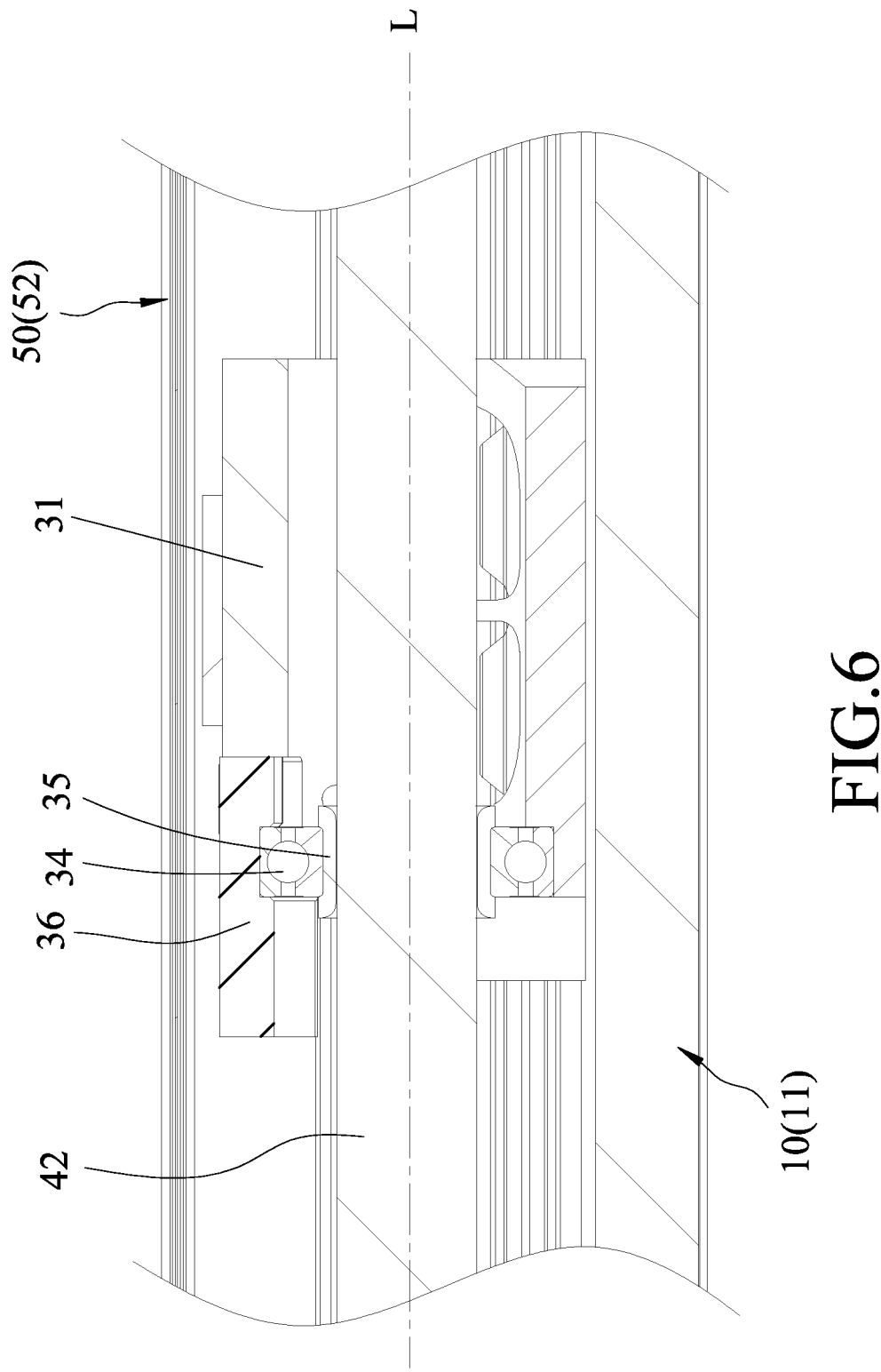
FIG. 6 is another enlarged view from FIG. 4.
Figure 9:
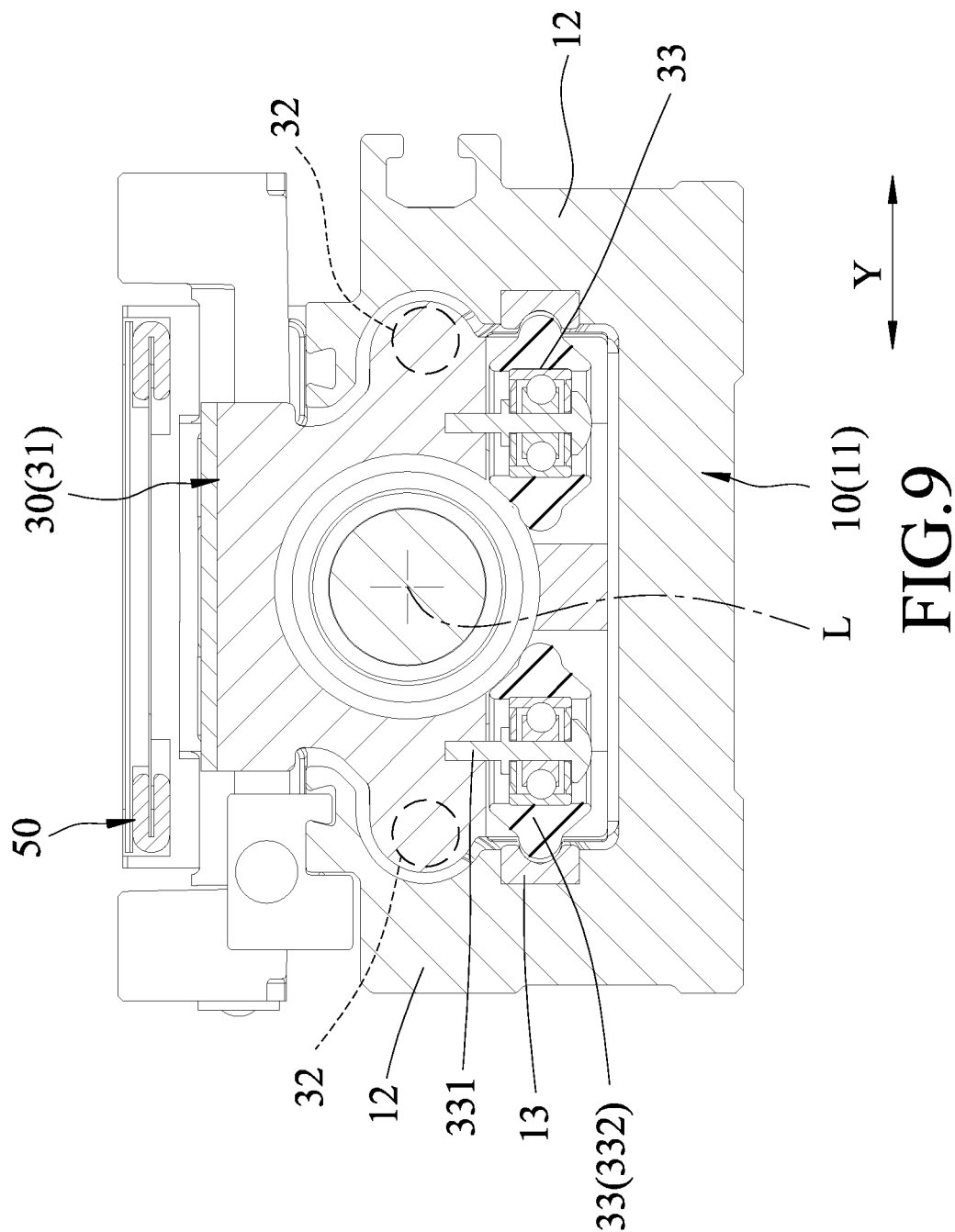
FIG. 9 is a sectional view taken along line IX-IX of FIG. 5.
Figure 10:
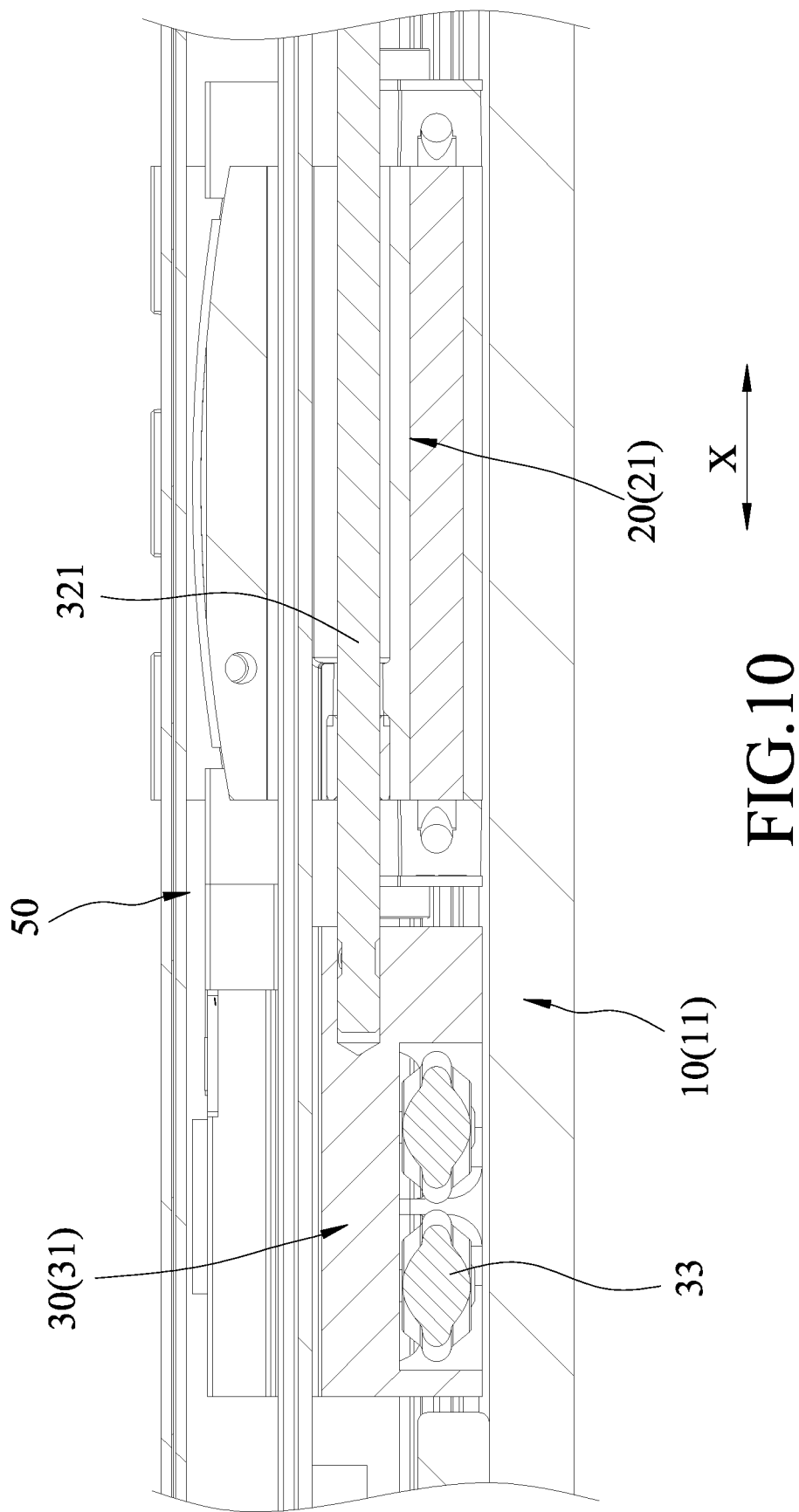
FIG. 10 is a sectional view taken along line X-X of FIG. 8.
Figure 11:
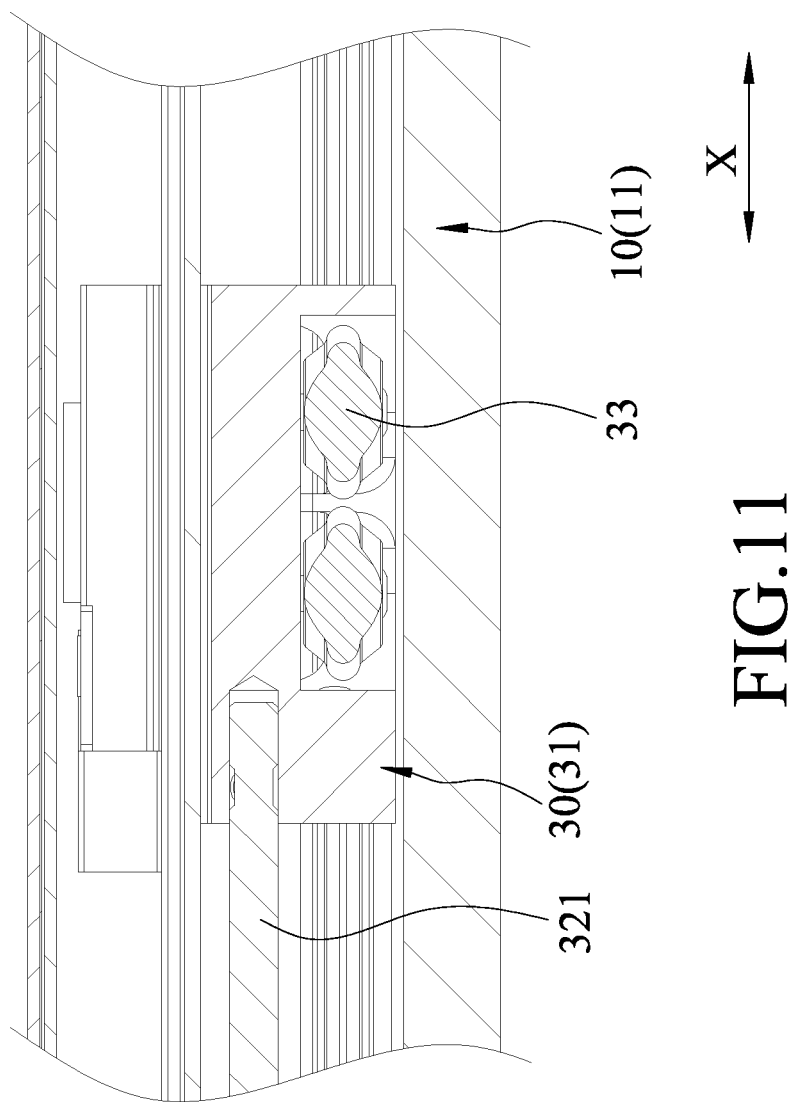
FIG. 11 is a sectional view taken along line XI-XI of FIG. 8.

Referring to FIGS. 5, 6 and 9, the embracing unit 30 includes two auxiliary sliding seats 31, a connection member 32, two roller sets 33, two ball bearings 34, two overmolded bearings 35, and two second bumper blocks 36. The two auxiliary sliding seats 31 are slidable in the lengthwise direction (X) and mounted to the base unit 10.

The auxiliary sliding seats 31 are respectively disposed on two sides of the sliding seat unit 20 that are opposite in the lengthwise direction (X).

The connection member 32 is connected between the auxiliary sliding seats 31. As shown in FIGS. 2, 8, 10, and 11, the connection member 32 has two rigid connection rods 321. Each rigid rod 321 is connected between and screwed to the auxiliary sliding seats 31 so that a fixed distance is formed between the auxiliary sling seats 31.

The two roller sets 33 are respectively mounted to the auxiliary sliding seats 31. Each roller set 33 has two fixing shafts 331 fastened to one of the auxiliary seats 31 (see FIG. 9) and two rollers 332 respectively and rotatably mounted to the fixing shafts 331. The rollers 332 are made from a rubber material and rollable on the first hardened rails 13.

The two ball bearings 34 are respectively disposed inside the auxiliary sliding seats 31. The two overmolded bearings 35 are directly and respectively overmolded on inner surfaces in the ball bearings 34. The overmolded bearings 35 are directly and slidably sleeved on the driving screw rod 42.

The two second bumper blocks 36 are respectively mounted to the auxiliary sliding seats 31 to respectively face the first bumper blocks 23.

Figure 7:
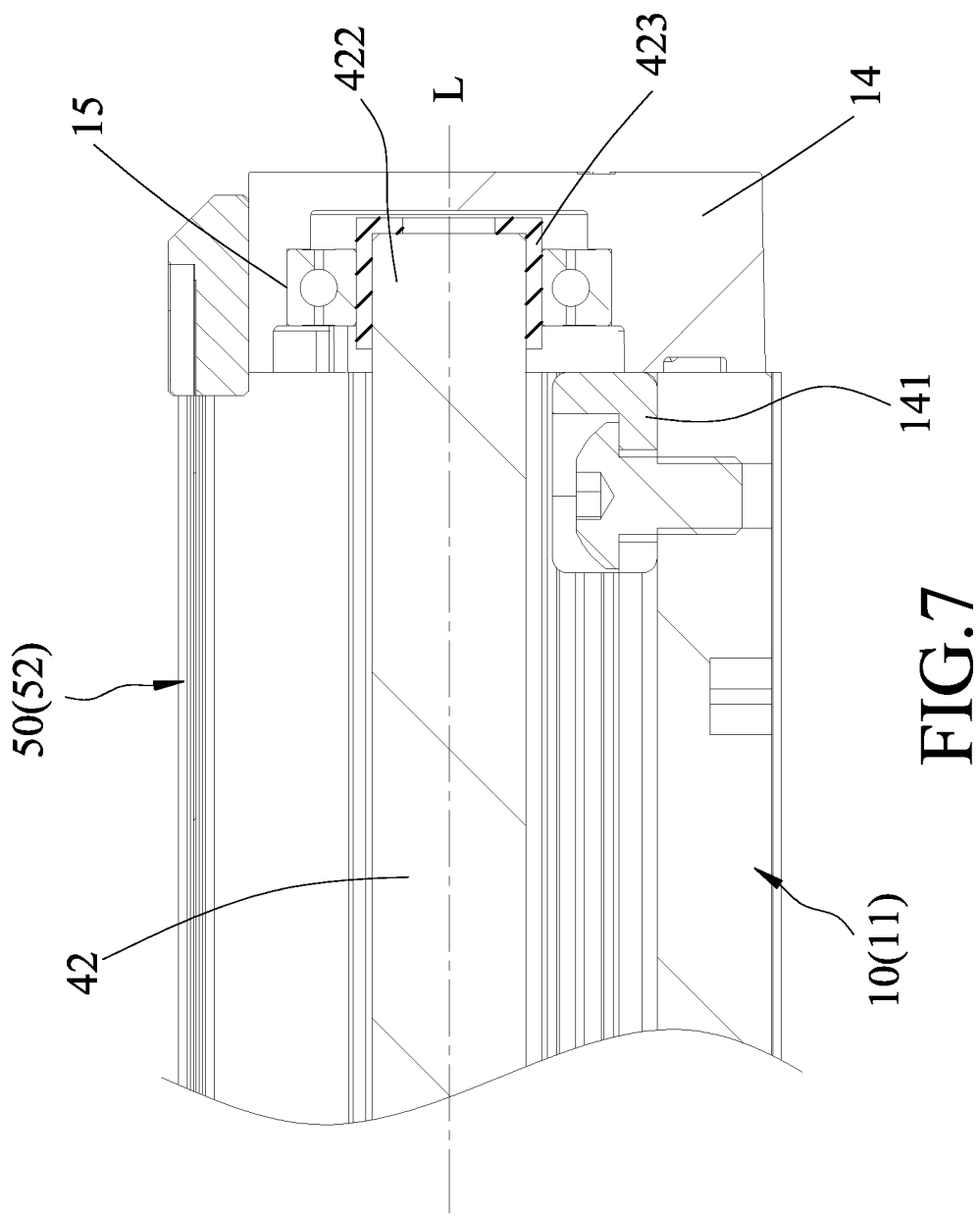
FIG. 7 is still another enlarged view from FIG. 4.

As shown in FIGS. 5 and 7, the driving unit 40 includes a power driver 41 and a driving screw rod 42.

The power driver 41 is mounted to the base unit and composed of a direct drive motor 411, a coupling 412, and a fixing seat 413. The fixing seat 413 has a bottom bumper block 414 disposed at a bottom end thereof. In this embodiment, the end seat 14 of the base unit 10 is opposite to the power driver 41 in the lengthwise direction (X).

The driving screw rod 42 is connected to the power driver 41 and threadedly coupled to the sliding seat unit 20. In this embodiment, the nut 22 of the sliding seat unit 20 threadedly engages the driving screw rod 42. The driving screw rod 42 has a first end 421 connected to and rotatable by the power driver 41 and a second end 422 opposite to the first end 421 in the axial line (L). In addition, the driving unit 40 further includes an end cap 423 surrounded by the end bearing 15 and covering the second end 422 of the driving screw rod 42. The overmolded bearings 35 are slidably sleeved on the driving screw rod 42. The end cap 423 is made from a rubber material.

Figure 8:
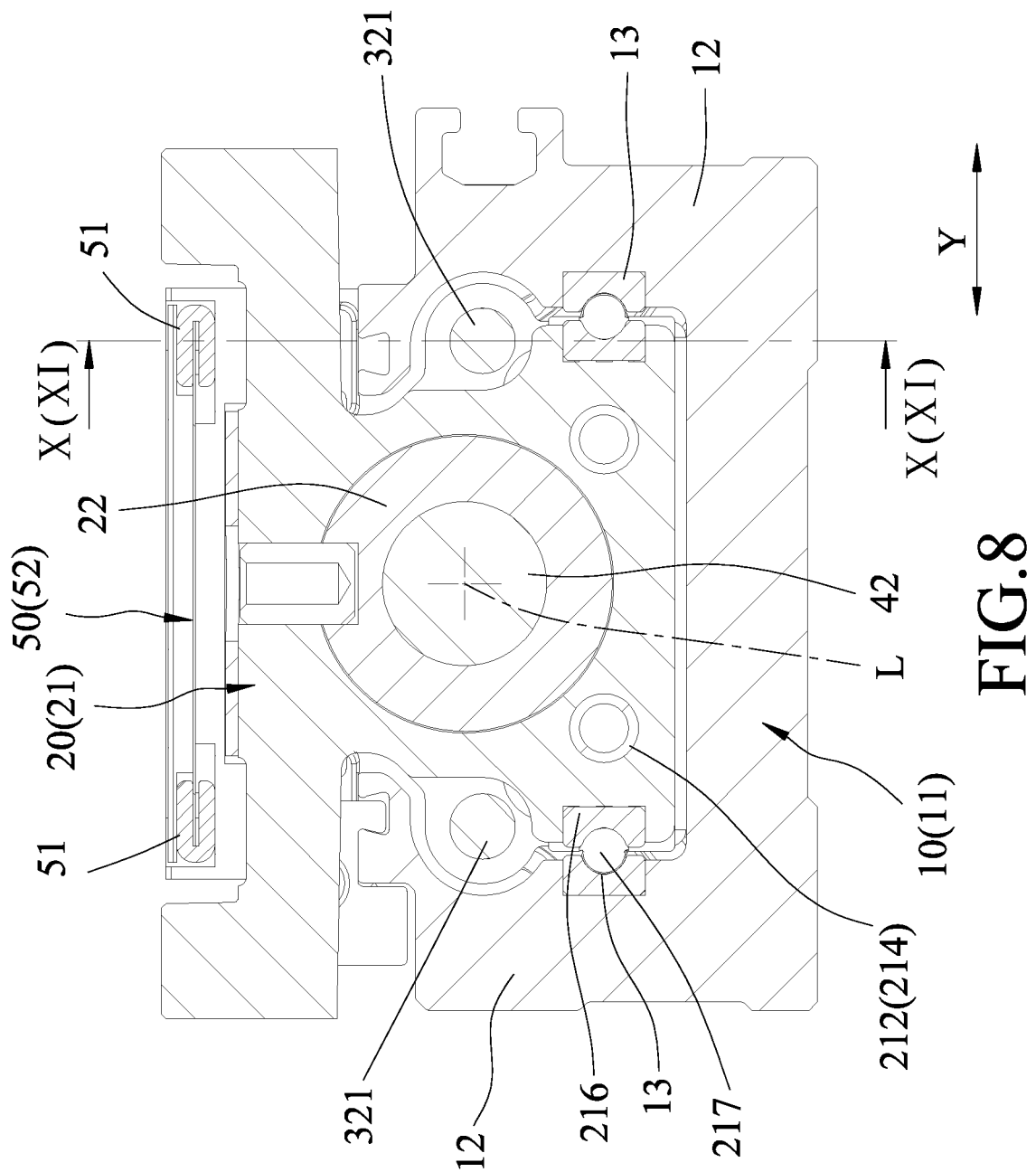
FIG. 8 is a sectional view taken along line VIII-VIII of FIG. 5.

The protective cover unit 50 covers top ends of the side walls 12 opposite to the base wall 11. As shown in FIGS. 5, 7, and 8, the protective cover unit 50 includes two protective sleeves 51 fixed between the fixing seat 413 and the end seat 14, and a dustproof steel belt 52 pinched by and positioned between the protective sleeves 51.

As shown in FIGS. 1, 4, 5, 7, and 8 to 11, when the direct drive motor 411 is activated and drives the driving screw rod 42 to rotate with respect to the base 10 through the coupling 412, the siding unit 20 is driven by the driving screw rod 42 to slide in the lengthwise direction (X) and pushes the auxiliary sliding seats 31 to slide together therewith. For example, as the sliding unit 20 moves toward the fixing seat 413 at the left sides of FIG. 5, the auxiliary sliding seat 31 at the left side of the sliding unit 20 is pushed by the sliding unit 20 and moves toward the fixing seat 413, and the auxiliary sliding seat 31 at the right side of the sliding unit 20 is moved together toward the fixing seat 413 due to the rigid connection rods 321 each connected between the auxiliary sliding seats 31. Similarly, as the sliding unit 20 moves toward the end seat 14 opposite to the fixing seat 413, the sliding seats 31 are moved together toward the end seat 14 through the sliding unit 20 and the rigid connection rods 321.

By virtue of the rollers 332 connected to the sliding seats 31 and rollable on the first hardened rails 13, the sliding seats 31 can smoothly move with respect to the base unit 10.

In the case of the sliding table assembly having a relatively large length, the ratio of the axial length to the diameter of the screw rod 42 can be too high; the screw rod 42 can be too thin so that the weight of the screw rod per se will cause the screw rod to sag. This can affect the normal operation of the sliding table assembly and reduce the service life of the driving screw rod 42. Because the driving screw rod 42 is embraced and supported by the auxiliary sliding seats 31, which prevent the driving screw rod 42 from sagging, not only a normal operation of the sliding table assembly can be maintained, but also the service life of the driving screw rod 42 can be increased.

In conclusion, the sliding table assembly has the following effects.

1. The auxiliary sliding seats 31 are in contact with the first hardened rails 13 through the rollers 332. Because the rollers 332 are made from a rubber material, the rollers 332 are deformable to absorb assembly clearance errors and adjust tolerance between the rollers 332 and the first hardened rails 13 and also reduce noises occurring during operation.
2. Since the rigid connection rods 321 connect between the auxiliary sliding seats 31 for concomitant movement of the auxiliary sliding seats 31, the connection between the auxiliary sliding seats 31 is simple compared to the prior art and can be easily assembled.
3. The second end 422 of the driving screw rod 42 is just covered by the end cap 423 without being subjected to any machining process, thereby reducing processing errors.
4. The sliding movement of the sliding seat unit 20 is limited between the two limiting bumper blocks 16. When the sliding seat unit 20 reaches one of the limiting bumper blocks 16 and when one of the first bumper blocks 23 on the main body 21 hits the second bumper block 36 of one of the auxiliary sliding seats 31, a reaction force is generated by the auxiliary sliding seat 31 that is hit. By virtue of the end seat 14 having the end bumper block 141 (see FIG. 7) and the fixing seat 413 having the bottom bumper block 414, when each auxiliary sliding seat 31 is hit, it is prevented from directly impacting the fixing seat 413 or the end seat 14.
5. Because the auxiliary sliding seats 31 can prevent the driving screw rod 42 from sagging, when the base unit 10 and the driving screw rod 42 are lengthwise lengthened, the rotation speed of the driving screw rod 42 need not be reduced for avoiding vibration of the driving screw rod 42.

6. By virtue of the rigid connection rods 321, the auxiliary sliding seats 31 are integrally connected to each other and maintained with a constant distance therebetween. The auxiliary sliding seats 31 can be assembled easily in comparison with a rope-pulling type support structure of the prior art. Because the constant distance is maintained between the auxiliary sliding seats 31, even when the sliding seat 20 hits one of the auxiliary seats 31, the two auxiliary sliding seats 31 are still spaced from each other at the constant distance to support the driving screw rod 42. Therefore, the driving screw rod 42 is prevented from vibration and can perform a long stroke and high speed operation.

7. By virtue of the overmolded bearings 35 respectively overmolded inside the ball bearings 34, assembly complexity can be reduced.

In the description above, for the purposes of explanation, numerous specific details have been set forth in order to provide a thorough understanding of the embodiment. It will be apparent, however, to one skilled in the art, that one or more other embodiments may be practiced without some of these specific details. It should also be appreciated that reference throughout this specification to "one embodiment," "an embodiment," an embodiment with an indication of an ordinal number and so forth means that a particular feature, structure, or characteristic may be included in the practice of the disclosure. It should be further appreciated that in the description, various features are sometimes grouped together in a single embodiment, figure, or description thereof for the purpose of streamlining the disclosure and aiding in the understanding of various inventive aspects, and that one or more features or specific details from one embodiment may be practiced together with one or more features or specific details from another embodiment, where appropriate, in the practice of the disclosure.

While the disclosure has been described in connection with what is considered the exemplary embodiment, it is understood that this disclosure is not limited to the disclosed embodiment but is intended to cover various arrangements included within the spirit and scope of the broadest interpretation so as to encompass all such modifications and equivalent arrangements.

What is claimed is:

1. A sliding table assembly, comprising:
   a base unit extending in a lengthwise direction;
   a sliding seat unit slidable in the lengthwise direction and mounted to said base unit;
   an embracing unit, the embracing unit including:
      a pair of individual auxiliary sliding seats each being slidable in the lengthwise direction and mounted to said base unit, said pair of individual auxiliary sliding seats being distinct from and respectively disposed on two sides of said sliding seat unit that are opposite from one another in the lengthwise direction,
      a connection member connected between said pair of auxiliary sliding seats, and
      two roller sets respectively mounted to said pair of auxiliary sliding seats, each of said roller sets having a plurality of rollers to roll on said base unit; and
   a driving unit, the driving unit including:
      a power driver mounted to said base unit, and
      a driving screw rod connected to said power driver and threadedly coupled to said sliding seat unit, said driving screw rod being embraced by each of said pair of auxiliary sliding seats to thereby support said driving screw rod against sagging; and
   wherein, when said power driver drives said driving screw rod to rotate with respect to said base unit, said siding unit is driven by said driving screw rod to slide in the lengthwise direction and pushes said pair of auxiliary sliding seats to slide together therewith.

2. The sliding table assembly as claimed in claim 1, wherein said connection member has two rigid connection rods each connected between and affixed to said pair of auxiliary sliding seats so that a constant distance is formed between said pair of auxiliary sling seats.

3. The sliding table assembly as claimed in claim 1, wherein
   said base unit includes a base wall, two side walls extending from said base wall and spaced apart from each other in a transverse direction transverse to the lengthwise direction, and two first hardened rails respectively mounted to said side walls; and
   said rollers are made from a rubber material and rollable on said first hardened rails.

4. The sliding table assembly as claimed in claim 3, wherein
   said base unit further includes an end seat opposite to said driving member in the lengthwise direction and fixed to said base and side walls, and an end bearing disposed in said end seat; and
   said driving unit further includes an end cap surrounded by said end bearing and covering an end of said driving screw rod.

5. The sliding table assembly as claimed in claim 3, wherein
   said sliding seat unit includes a main body, a nut fixed in said main body and threadedly engaging said driving screw rod, and two first bumper blocks respectively disposed on two sides of said main body that are opposite in the lengthwise direction; and
   said embracing unit further includes two second bumper blocks respectively mounted to said auxiliary sliding seats to respectively face said first bumper blocks.

6. The sliding table assembly as claimed in claim 5, wherein
   said main body has an axial hole extending in the lengthwise direction, and two spaced apart through holes extending in the lengthwise direction and offset from said axial hole;
   said sliding seat unit further includes two inner tubes respectively extending through said through holes, two side seats respectively mounted to said two opposite sides of said main body, two second hardened rails fixed to said main body and respectively facing said first hardened rails, and two roller modules; and
   one of said inner tubes, said side seats, one of said second hardened rails, and one of said first hardened rails cooperatively defining a cyclic passage for one of said roller modules to move cyclically.

7. The sliding table assembly as claimed in claim 1, wherein said base unit includes a base wall, two side walls extending from said base wall and spaced apart from each other in a transverse direction transverse to the lengthwise direction, and two limiting bumper blocks mounted to one of said side walls and respectively proximate to two ends of said base unit that are opposite in the lengthwise direction.

8. The sliding table assembly as claimed in claim 1, wherein said embracing unit further includes two ball bearings respectively disposed in said pair of auxiliary sliding seats, and two overmolded bearings respectively overmolded in said ball bearings and slidably sleeved on said driving screw rod.

* * * * *